UNITED STATES PATENT OFFICE.

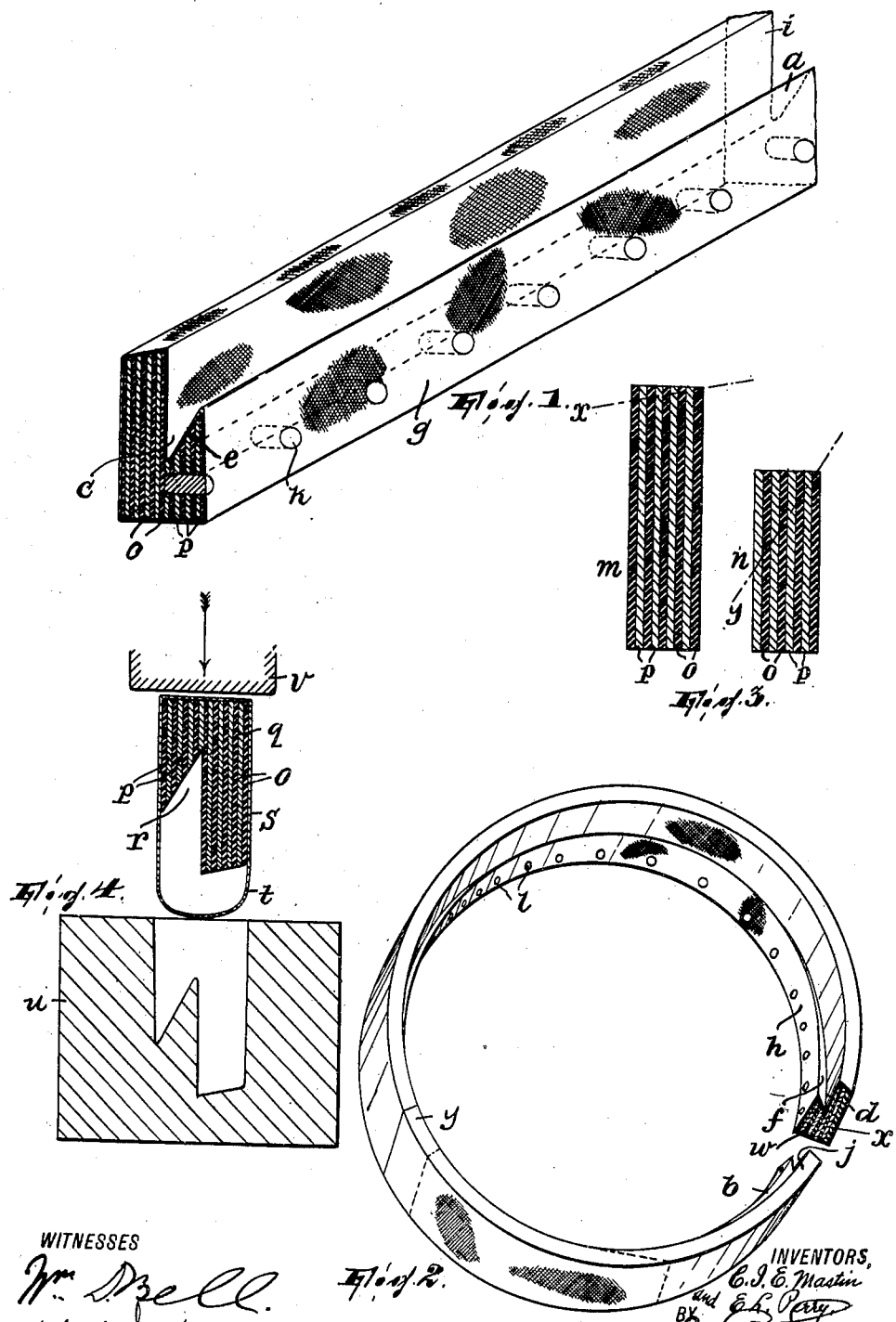

CHARLES I. E. MASTIN, OF MIDLAND PARK, AND EDWARD L. PERRY, OF PATERSON, NEW JERSEY.

PACKING AND METHOD OF MAKING THE SAME.

943,692.      Specification of Letters Patent.      Patented Dec. 21, 1909.

Application filed August 23, 1909. Serial No. 514,088.

*To all whom it may concern:*

Be it known that we, CHARLES I. E. MASTIN and EDWARD L. PERRY, both citizens of the United States, residing in Midland Park, Bergen county, and Paterson, Passaic county, New Jersey, respectively, have invented certain new and useful Improved Packing and the Method of Making the Same; and we do hereby declare the following to be a full, clear, and exact description of the invention, such as will enable others skilled in the art to which it appertains to make and use the same, reference being had to the accompanying drawing, and to letters of reference marked thereon, which form a part of this specification.

Our invention relates to the manufacture of packings, and it has for its object to provide a packing universally adapted for use in the many instances where it is necessary to prevent the escape of fluids between machine parts or the like.

In carrying our invention into a practical form, we have had in mind to construct the packing so that it will effectually prevent, in a more permanent way than packings heretofore devised, the passage of fluids, although the same may be under great pressure and notwithstanding the fluids may possess deteriorating qualities and one of the parts packed may be a moving one and therefore calculated to produce considerable wear and tear on a body in the nature of a non-metallic packing.

We have illustrated our invention fully and clearly in the accompanying drawing, wherein, Figure 1 is an isometric view of one form of the improved packing; Fig. 2 is a perspective view of another form of the improved packing; Fig. 3 illustrates, in section, the two parts of the core of the packing separated and before they are shaped preparatory to assembling; and, Fig. 4 illustrates the manner in which the assembled core-parts are assembled with their pliable reinforce or casing.

Generally stated, in the preferred form shown, the improved packing is an attenuated somewhat yielding and elastic body having its two side faces substantially parallel and having a longitudinal substantially wedge-shaped depression formed in what is the top thereof in Figs. 1 and 2 of the drawing, the surface of said depression which adjoins one side surface of the body forming therewith approximately an acute angle whose apex is continuously lower than the remaining portion of said body; the packing may be sold in straight lengths, as shown in Fig. 1, in which case it is cut off to the proper length by the user and then bent into annular form to fit the annular space to be packed, or it may be sold in the circular shape shown in Fig. 2. When the packing is placed in the space to be packed, its lip (*a* in Fig. 1 and *b* in Fig. 2) lies in close contact with the surrounded or surrounding one of the two machine parts which form the lateral walls of said space, and since said lip, which is produced by the depression above referred to (*c* in Fig. 1 and *d* in Fig. 2), has its inner surface (*e* in Fig. 1 and *f* in Fig. 2) beveled to converge with the outer surface thereof, which is continuous with the side *g* in Fig. 1 (*h*, Fig. 2), the lip is held in close contact with said part, or made to hug the same, by the pressure of the fluid and acts further to distribute uniformly the lubricant where such is used, as where one of the parts packed is a moving one. The portion *i* in Fig. 1 (*j* in Fig. 2), being higher than the lip, keeps the edge of the latter free of the part impinged by the top surface of the packing, which part may be either the end-wall of the space to be packed or another packing; said portion *i* (or *j*) is preferably beveled, as shown, so as to form a more hermetic seal with the part against which it bears. To reduce the wear on the side *g* (or *h*) of the packing, Babbitt metal studs are set therein, marked *k* in Fig. 1 and *l* in Fig. 2.

We will now describe the improved packing with respect to its structure and the method of making the same, omitting reference particularly to Fig. 2 for the meanwhile, since up to the point to be indicated later the packing there shown is identical to that shown in Fig. 1; we first form two attenuated sections or parts *m* and *n*, each comprising alternating layers of rubber compound *o* and duck or other pliable and tough material *p* held together by the adhesion of the rubber compound and having (particularly the rubber layers) their edges exposed; viewed cross-sectionally, Fig. 3, the part *m* is higher than the part *n*. The top of each is then removed from end to end thereof at the bevels indicated by the lines *x*— and *y*—, respectively, and the two parts placed in contact with each other, the adhesion of the outer rubber layer of one holding them together; the sides of the two parts which are thus brought into contact are their adjacent sides in Fig. 3, so that the core $q$ produced by their union has the attenuated depression $r$ formed therein. The core $q$ thus produced is then inserted into a tubular duck or other tough, pliable envelop or casing $s$, the material of which is substantially non-stretching; the circumferential dimension of said casing is internally substantially equal to the circumferential surface dimension of said core, so that at first a longitudinally extending portion $t$, Fig. 4, will remain standing somewhat loose or free. Said core $q$, enveloped in the casing, is now introduced into the mold $u$ with its depression toward the mold, whereupon the plunger $v$ is made to descend and force the fabric-enveloped core into the mold, the effect of which is to cause the casing to fit snugly every part of said core; inasmuch as the outer layers of the core $q$ are of rubber, the casing adheres closely to the same and also to the faces of said core comprising the exposed edges of the rubber layers. Thereupon, and while the enveloped core $q$ is yet in the mold and under pressure, the packing is "cured" or vulcanized. The resultant product is a body having a yielding core held more or less in a state of compression by the casing $s$; the yielding and elastic qualities of such body depend, of course, upon the relative thicknesses of the rubber and duck layers of its core and the degree of compression under which the core is held by the casing. Subsequently, holes may be formed in the packing and the Babbitt-metal plugs or studs introduced therein.

Up to the point of forming the core by placing the attenuated parts each comprising alternating layers of rubber compound and duck or the like in adhering contact with each other, the packing shown in Fig. 2 is produced in the same manner as that shown in Fig. 1. Thereupon the core $w$ is introduced into the casing $x$ and the whole bent into circular form, the two ends of the core being lapped or otherwise jointed and adhering and the ends of the casing being lapped by inserting one within the other, as indicated at $y$ in Fig. 2, the casing being a little longer than the core to permit this; the lap formed by the ends of the casing is preferably removed from the joint formed between the ends of the core, as shown, so as to prevent any undue enlargement. In this case, the casing is loose or free initially, the same as the casing shown in Fig. 4. The enveloped core is now introduced into a mold shaped cross-sectionally the same as the mold in Fig. 4, pressure brought to bear upon it to cause its casing to assume a snug fitting relation to it and to adhere thereto at substantially all parts of its surfaces, and then "cured" or vulcanized while under pressure in the mold.

The enveloping casing since it adheres firmly to the core and holds the same under more or less compression, prevents the breaking down thereof, by the separation of its component parts or otherwise, as by the separation of the layers forming its lip or of the sections $m$ and $n$ of the core; it also acts to prevent the lip from turning or curling over under the frictional action of a moving part with which it may lie in contact.

Having thus fully described our invention, what we claim and desire to secure by Letters Patent is:

1. As an article of manufacture, a packing for joints comprising alternating layers of rubber compound and tough pliable material secured together by the adhesion of the rubber compound, the edges of said layers together forming substantially plane surfaces, substantially as described.

2. As an article of manufacture, a packing for joints consisting of a core, comprising alternating layers of rubber compound and tough pliable material secured together by the adhesion of the rubber compound, the edges of said layers together forming substantially plane surfaces, and a casing lying in adhering contact with the outer face of an exposed or outermost layer and with edges of said layers forming one of said plane surfaces, substantially as described.

3. As an article of manufacture, a packing for joints consisting of a core comprising alternating layers of rubber compound and tough pliable material secured together by the adhesion of the rubber compound, the edges of said layers together forming substantially plane surfaces, and a casing closely enveloping said core and adhering to the exposed surfaces thereof, substantially as described.

4. As an article of manufacture, a packing for joints comprising a yielding core having an elongated lip formed substantially wedge-shaped in cross-section and a reinforcing casing lying in covering relation to all of the exposed surfaces of said lip and adhering to both surfaces thereof, substantially continuously of the latter, substantially as described.

5. As an article of manufacture, a packing for joints comprising a yielding core having an elongated lip formed substantially wedge-shaped in cross-section and forming in said core a longitudinal depression, and a reinforcing casing lying in enveloping relation to the core and adhering to substantially all portions of the surfaces of said core, substantially as described.

6. As an article of manufacture, a packing for joints comprising a core formed of alternated layers of rubber compound and tough pliable material and having a longitudinal lip formed substantially wedge-shaped in cross-section, one surface of said lip including the edges of several of said layers, and a reinforcing casing lying in covering relation and secured by the adhesion of the rubber compound to said surface of the lip in substantially all portions thereof, substantially as described.

7. As an article of manufacture, a packing for joints comprising a core itself comprising two sections lying with the face of one in contact with a face of the other and one being beveled on the side thereof adjoining the other and thereby forming a depression between said sections, and a reinforcing casing lying in covering relation and adhering to the surfaces of said depression, substantially as described.

8. As an article of manufacture, a packing for joints comprising an elongated core having a longitudinal depression therein, and a reinforcing casing enveloping said core and adhering to substantially all parts of the longitudinal surfaces thereof, substantially as described.

9. The herein described method of manufacturing a packing for joints which consists in forming an attenuated core having a longitudinal depression therein, enveloping said core in a pliable reinforce having an interior circumferential dimension substantially equaling the circumferential dimension of the core, pressing the reinforce into the depression of the core until the reinforce is brought into fitting relation to substantially all portions of the longitudinal surfaces of the core and simultaneously causing the reinforce to adhere to the core, and finally vulcanizing the article thus formed, substantially as described.

In testimony whereof, we have hereunto set our hands this 20th day of August, 1909.

C. I. E. MASTIN.
E. L. PERRY.

Witnesses:
JOHN W. STEWARD,
WM. D. BELL.